Patented Dec. 12, 1944

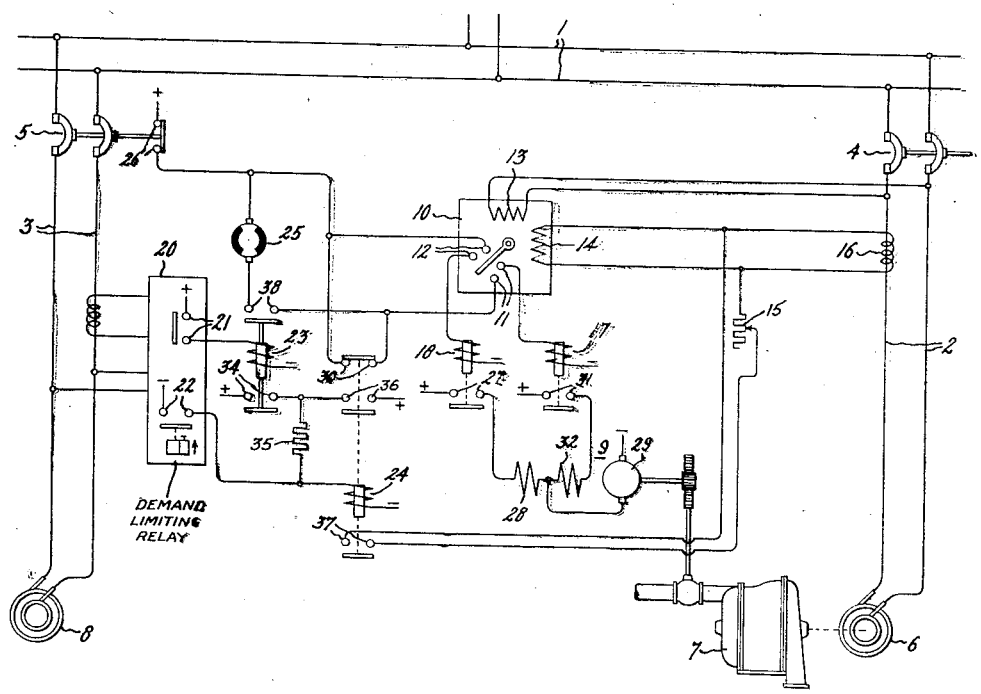

2,364,936

UNITED STATES PATENT OFFICE 2,364,936

REGULATING SYSTEM

Herman Bany, Lansdowne, Pa., assignor to General Electric Company, a corporation of New York Application April 30, 1943, Serial No. 485,175

11 Claims. (Cl. 171—119)

My invention relates to regulating systems and particularly to regulating systems for automatically controlling the load relation between a plurality of parallel connected sources of current.

One object of my invention is to provide a new and improved regulating system for controlling the load relation between a plurality of parallel connected sources of current so as to maintain different predetermined load distribution between them under different predetermined load conditions.

Another object of my invention is to provide a new and improved regulating system for securing a predetermined load distribution between a plurality of parallel connected sources which results in a material reduction in the duty of the regulating apparatus.

My invention will be better understood from the following description when taken in connection with the accompanying drawing, and its scope will be pointed out in the appended claims.

Referring to the accompanying drawing, the single figure of which diagrammatically illustrates an automatic load regulating system embodying my invention, a load circuit 1 is supplied with power from the supply circuits 2 and 3 which are respectively connected to the load circuit 1 by the circuit breakers 4 and 5. The supply circuit 2 is shown as having connected thereto a generator 6 which is driven by a suitable prime mover 7, such as a fluid operated turbine. The supply circuit 3 is shown as being supplied with power from a generator 8 which may be driven by any suitable type of prime mover, not shown.

The power output of the generator 6 is controlled by means of a reversible motor 9 which is shown as controlling the amount of fluid energy supplied to the prime mover 7. The motor 9 is normally under the control of a suitable power or current responsive relay 10 which is so connected to the supply circuit 2 that the contacts 11 of the relay are closed when the current or power output from the supply circuit 2 to the load circuit 1 is below a predetermined value and the contacts 12 of the relay are closed when the current or power output from the supply circuit 2 to the load circuit 1 is above said predetermined value. As shown in the drawing, the output relay 10 is a power responsive relay having a voltage winding 13 connected across the supply circuit 2 and a current winding 14 which in parallel with a resistor 15 are connected across the secondary winding of a current transformer 16, the primary winding of which is connected in series relation with the supply circuit 2. The closing of the contacts 11 of the relay 10 is arranged to complete an energizing circuit for a control relay 17 which, in turn, is arranged to complete an operating circuit for the motor 9 so that it rotates in a direction to effect an increase in the supply of fluid energy to the prime mover 7, thereby increasing the power output of the generator 6. The closing of the contacts 12 of the relay 10 is arranged to complete an energizing circuit for a control relay 18 which, in turn, is arranged to complete an operating circuit for the motor 9 so that it rotates in a direction to effect a decrease in the supply of fluid energy to the prime mover 7, thereby decreasing the power output of the generator 6. Therefore, normally the power supplied from the supply circuit 2 to the load circuit 1 is maintained at a predetermined value which depends upon the most economical loading of the generator 6 and the supply circuit 3 supplies that portion of the total load which is required in excess of the amount supplied by the supply circuit 2.

In order to limit the amount of power supplied from the supply circuit 3 to the load circuit 1, I connect in the supply circuit 3 a demand limiting relay 20 of any suitable type, examples of which are well known in the art, and having contacts 21 which are closed whenever the total power output of the supply circuit 3 exceeds a predetermined value under predetermined conditions. In the particular embodiment shown in the drawing, the relay 20 is assumed to be of the well known block interval demand type which is operative during successive time intervals of predetermined duration to close the contacts 21 whenever for any elapsed portion of a time interval the power output of the supply circuit 3 exceeds a predetermined value for the elapsed portion of the time interval and at the end of each of the time intervals to open the contacts 21 in case they are closed and to close the contacts 22 momentarily. The contacts 21, however, when closed effect the successive energizations of the control relays 23 and 24. The control relay 24, when energized, changes the setting of the relay 10 by short-circuiting a portion of the resistor 15 so that a greater power output of the circuit 2 which depends upon the maximum load rating of the generator 6 is required to cause the power responsive relay 10 to open its contacts 11 and close its contacts 12. The energization of the control relay 24 also changes the connections to the control relay 17 so that it can be energized only by the energization of the control relay 23. The control relay 24 also completes a locking circuit for itself which is maintained completed until the end of the demand period is reached, at which time the relay 20 opens its contacts 21, in case they are closed, and momentarily closes its contacts 22. The arrangement shown in the drawing is such that while the relay 24 is energized, the output of the supply circuit 2 remains at the maximum value to which it may be adjusted as a result of the closing of the contacts 21 so long as this maximum output remains below the new higher setting of the power relay 10 effected by the relay 24 being in its energized position. A suitable interrupting device 25 is provided in the circuit of the relay 17 that is arranged to be completed by the relay 23 when it is in its energized position.

The operation of the arrangement shown in the drawing is as follows when both of the circuit breakers 4 and 5 are closed and the circuits 2 and 3 are supplying power to the load circuit 1. When the total load connected to the load circuit 1 is below a predetermined value, the output of the supply circuit 2 is maintained at a constant value and the supply circuit 3 furnishes the remaining portion of the total load until the load causes the demand limiting relay 20 to close its contacts 21. The output of the supply circuit 2 is maintained constant by the output relay 10 controlling the operation of the motor 9 in the following manner: If the output of the supply circuit 2 exceeds the setting of the relay 10, the contacts 12 of the relay 10 close and complete an energizing circuit for the control relay 18 through the contacts 26 of the closed circuit breaker 5. The closing of the contacts 27 of the relay 18 completes an operating circuit for the motor 9 through the field winding 28 and the armature winding 29 thereof so that the motor 9 operates in a direction to effect a decrease in the supply of fluid energy to the prime mover 7 thereby effecting a decrease in the power output of the supply circuit 2. If the output of the supply circuit 2 decreases below the setting of the relay 10, it closes its contacts 11 and completes through the contacts 26 of the circuit breaker 5 and the contacts 30 of the relay 24 an energizing circuit for the control relay 17. The closing of the contacts 31 of the control relay 17 completes an operating circuit for the motor 9 through the field winding 32 and the armature winding 29 thereof so that the motor 9 operates in a direction to effect an increase in the supply of fluid energy to the prime mover 7 thereby effecting an increase in the output of the supply circuit 2.

When the total load connected to the load circuit 1 is such that during any portion of a demand period the contacts 21 of the demand limiting relay 20 are closed, a circuit is completed for the control relay 23 which, in turn, by closing its contacts 34, completes a series circuit including the control relay 24 and the resistor 35. The closing of the contacts 36 of the relay 24 completes a shunt circuit around the contacts 34 of the relay 23 so that the relay 24 remains energized independently of the position of the relay 23. The closing of the contacts 37 of the relay 24 completes a shunt circuit around a portion of the resistor 15 so that a greater output of the supply circuit 2 is required to cause the power relay 10 to open its contacts 11 and close its contacts 12. The closing of the contacts 38 of the relay 23 completes through the contacts 26 of the circuit breaker 5, the interrupter 25, and the contacts 11 of the relay 10 an energizing circuit for the control relay 17 so that this relay is intermittently energized and effects, in the manner heretofore described, the operation of the motor 8 in a direction to effect an increase in the output of the supply circuit 2. The output of the supply circuit 2 is intermittently increased in this manner until either the contacts 21 of the demand limiting relay 20 are opened or the output of the supply circuit 2 is increased to a sufficiently high value to cause the relay 10 to open its contacts 11 and close its contacts 12, thereby limiting the output of the circuit 2 at this predetermined maximum value.

At the end of each of the demand periods, the contacts 21 of the relay 20 are opened, in case they are closed, and the contacts 22 of the relay 20 are closed to complete a shunt circuit around the winding of the relay 24 so as to effect the deenergization thereof if it is energized. In this manner, the regulating arrangement shown in the drawing is automatically reset to its normal position at the end of each demand period.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. A regulating arrangement for controlling the distribution of load between two supply circuits connected to a load circuit comprising regulating means responsive to the output of only one of said load circuits for regulating said output so that it is maintained constant at a predetermined value, and means responsive to a load demand of a predetermined character on the other supply circuit for modifying the operation of said regulating means to effect an increase in the output of said one of said supply circuits above said predetermined value while said load demand exists.

2. A regulating arrangement for controlling the distribution of load between two supply circuits connected to a load circuit comprising regulating means responsive to the output of only one of said load circuits for regulating said output so that it is maintained constant at a predetermined value, and means responsive to a load demand of a predetermined character on the other supply circuit for modifying the operation of said regulating means to effect an increase in the output of said one of said supply circuits within a predetermined range above said predetermined value while said load demand exists.

3. A regulating arrangement for controlling the distribution of load between two supply circuits connected to a load circuit comprising regulating means responsive to the output of only one of said load circuits for regulating said output so that it is maintained constant at a predetermined value, means responsive to a load demand of a predetermined character within a predetermined time interval on the other supply circuit, means controlled by said demand responsive means for increasing the output of said one of said supply circuits and for rendering said regulating means inoperative to maintain the output of said one of said supply circuits at said predetermined value.

4. A regulating arrangement for controlling the distribution of load between two supply circuits connected to a load circuit comprising regulating means responsive to the output of only one of said load circuits for regulating said output so that it is maintained constant at a predetermined value, means responsive to a load demand of a predetermined character within a predetermined time interval on the other supply circuit, means controlled by said demand responsive means for increasing the output of said one of said supply circuits and for rendering said regulating means inoperative to maintain the output of said one of said supply circuits at said predetermined value and operative to limit the output of said one of said supply circuits at a predetermined value above said first mentioned predetermined value.

5. A regulating arrangement for controlling the distribution of load between two supply circuits connected to a load circuit comprising regulating means responsive to the output of only one of said load circuits for regulating said output so that it is maintained constant at a predetermined value, means responsive to a load demand of a predetermined character within a predetermined time interval on the other supply circuit, means controlled by said demand responsive means for increasing the output of said one of said supply circuits to decrease said load demand on said other supply circuit and for rendering said regulating means inoperative to maintain the output of said one of said supply circuits at said predetermined value and operative during the remaining portion of said time interval to maintain said output at the maximum value to which it is increased by the operation of said demand responsive means.

6. A regulating arrangement for controlling the distribution of load between two supply circuits connected to a load circuit comprising regulating means for varying the output of one of said circuits including a reversible motor arranged when rotated in one direction to effect an increase in said output and when rotated in the opposite direction to effect a decrease in said output, means responsive to the output of only said one of said circuits for effecting the operation of said motor in said opposite direction when said output exceeds a predetermined value and for effecting the operation of said motor in said one direction when said output is below said predetermined value, means responsive to a load demand of a predetermined character within a predetermined time interval on the other supply circuit for effecting the operation of said motor in said one direction only when said load demand is of said predetermined character.

7. A regulating arrangement for controlling the distribution of load between two supply circuits connected to a load circuit comprising regulating means for varying the output of one of said circuits including a reversible motor arranged when rotated in one direction to effect an increase in said output and when rotated in the opposite direction to effect a decrease in said output, means responsive to the output of only said one of said circuits for effecting the operation of said motor in said opposite direction when said output exceeds a predetermined value and for effecting the operation of said motor in said one direction when said output is below said predetermined value, means responsive to a load demand of a predetermined character within a predetermined time interval on the other supply circuit for effecting the operation of said motor in said one direction only when said load demand is of said predetermined character and for causing said regulating means during the remaining portion of said time interval to maintain said output at the maximum value to which it is increased by the operation of said load demand responsive means.

8. A regulating arrangement for controlling the distribution of load between two supply circuits connected to a load circuit comprising regulating means for varying the output of one of said circuits including a reversible motor arranged when rotated in one direction to effect an increase in said output and when rotated in the opposite direction to effect a decrease in said output, means responsive to the output of only said one of said circuits for effecting the operation of said motor in said opposite direction when said output exceeds a predetermined value and for effecting the operation of said motor in said one direction when said output is below said predetermined value, means responsive to a load demand of a predetermined character within a predetermined time interval on the other supply circuit for resetting said output responsive means so that a predetermined larger value of said output is required to effect the operation thereof and so that it can effect the operation of said motor in said one direction only when said load demand is of said predetermined character and said output is below said larger value.

9. A regulating arrangement for controlling the distribution of load between two supply circuits connected to a load circuit comprising regulating means for varying the output of one of said circuits including a reversible motor arranged when rotated in one direction to effect an increase in said output and when rotated in the opposite direction to effect a decrease in said output, means responsive to the output of only said one of said circuits for effecting the operation of said motor in said opposite direction when said output exceeds a predetermined value and for effecting the operation of said motor in said one direction when said output is below said predetermined value, means responsive to a load demand of a predetermined character within a predetermined time interval on the other supply circuit for resetting said output responsive means so that a predetermined larger value of said output is required to effect the operation thereof and so that it can effect the operation of said motor in said one direction only when said load demand is of said predetermined character and said output is below said larger value and for causing said regulating means during the remaining portion of said time interval to maintain said output at the maximum value to which it is increased by the operation of said load demand responsive means.

10. A regulating arrangement for controlling the distribution of load between two supply circuits connected to a load circuit comprising regulating means responsive to the output of only one of said load circuits for regulating said output so that it is maintained constant at a predetermined value, and block interval demand relaying means responsive to the load demand on the other supply circuit for modifying the operation of said regulating means.

11. A regulating arrangement for controlling the distribution of load between two supply circuits connected to a load circuit comprising regulating means responsive to the output of only one of said load circuits for regulating said output so that it is maintained constant at a predetermined value, and block interval demand relaying means responsive to the load demand on the other supply circuit exceeding a predetermined value for causing said regulating means to maintain the output of said one of said supply circuits within a different predetermined range during the remaining portion of the demand period.

HERMAN BANY.